No. 734,742. PATENTED JULY 28, 1903.
M. W. PATRICK.
STEERING DEVICE.
APPLICATION FILED SEPT. 11, 1902.
NO MODEL. 2 SHEETS—SHEET 1.
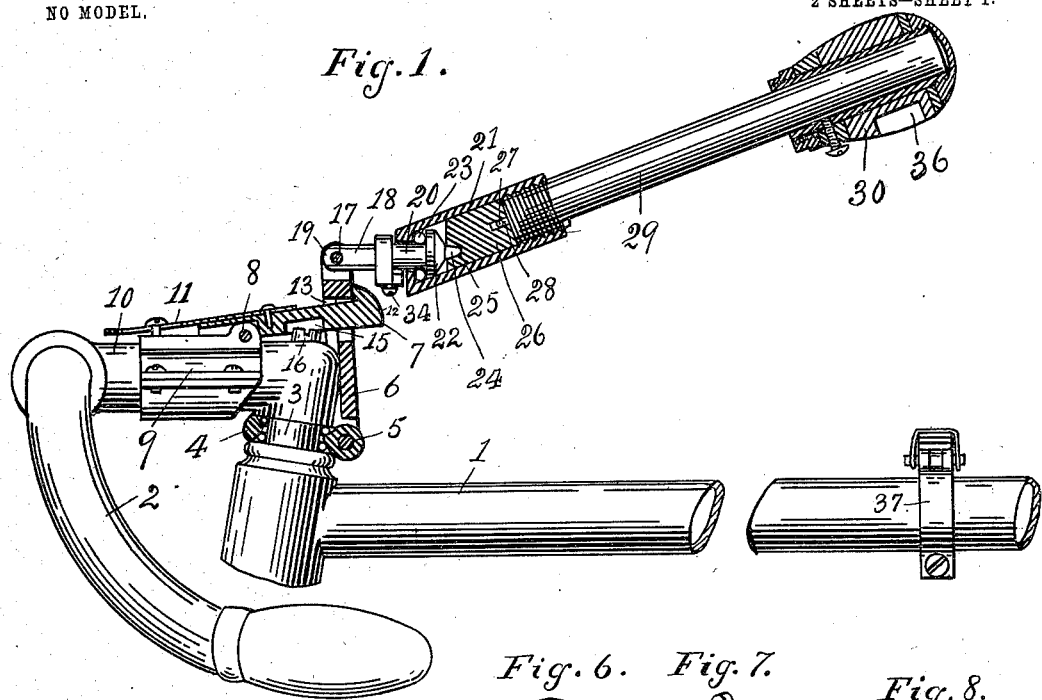
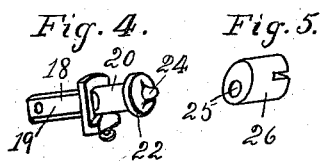
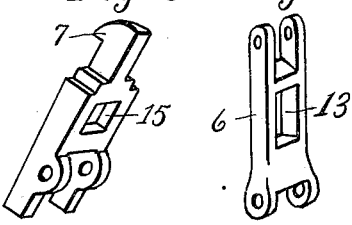
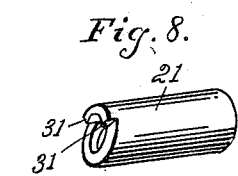
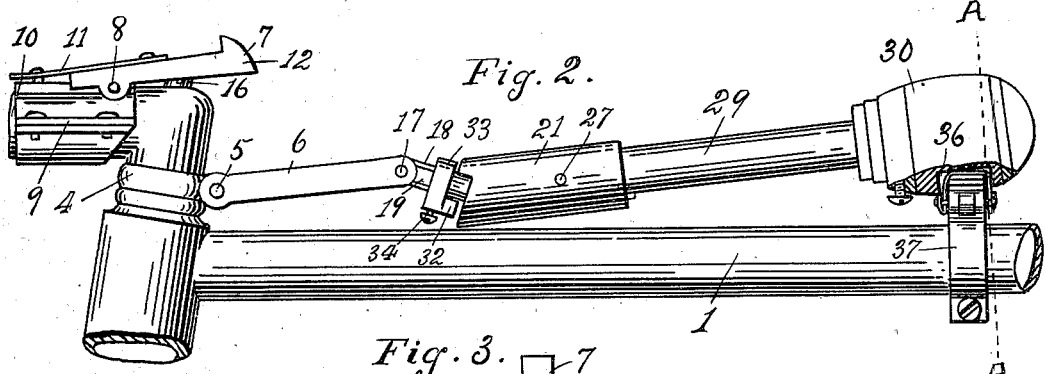
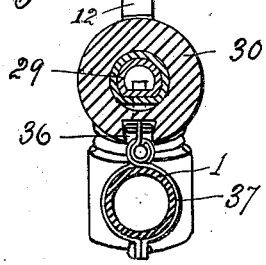
WITNESSES:
Bessie Gorfinkel
K. Lockwood Nevins
INVENTOR.
Marshall W. Patrick
BY
Francis M. Wright,
ATTORNEY.
THE NORRIS PETERS CO., PHOTO-LITHO., WASHINGTON, D. C.

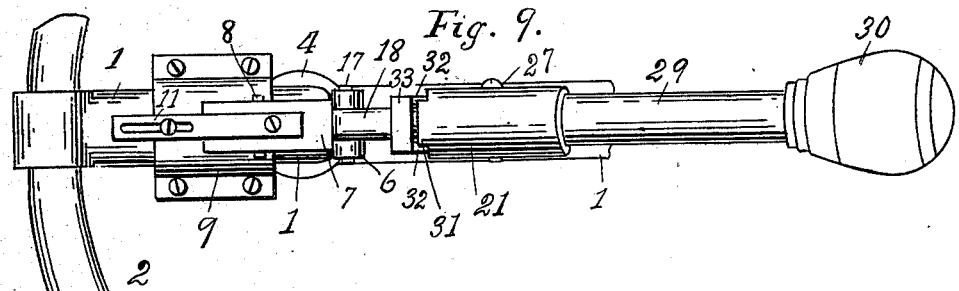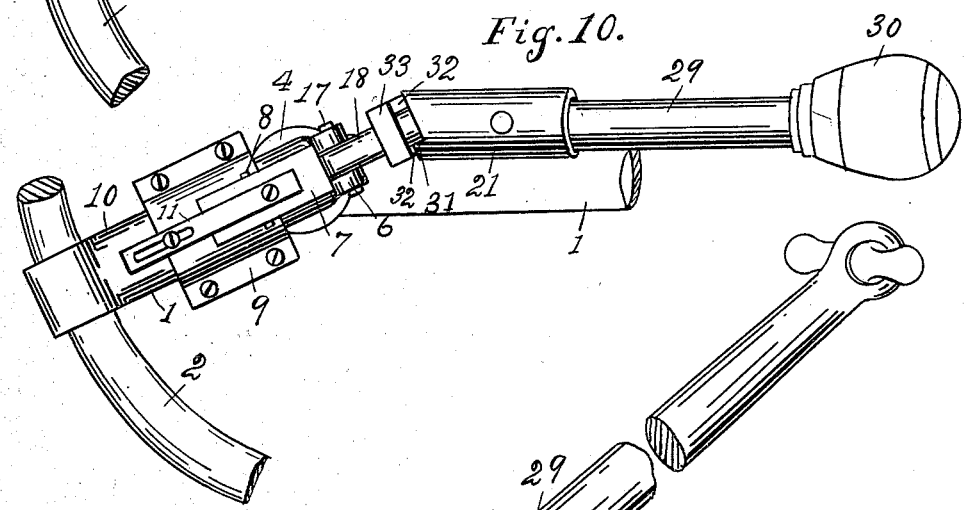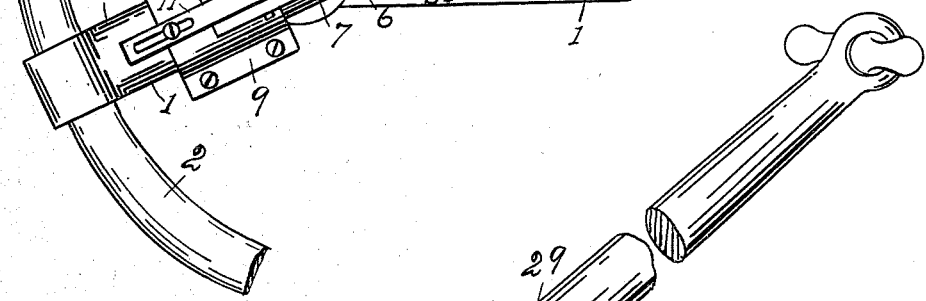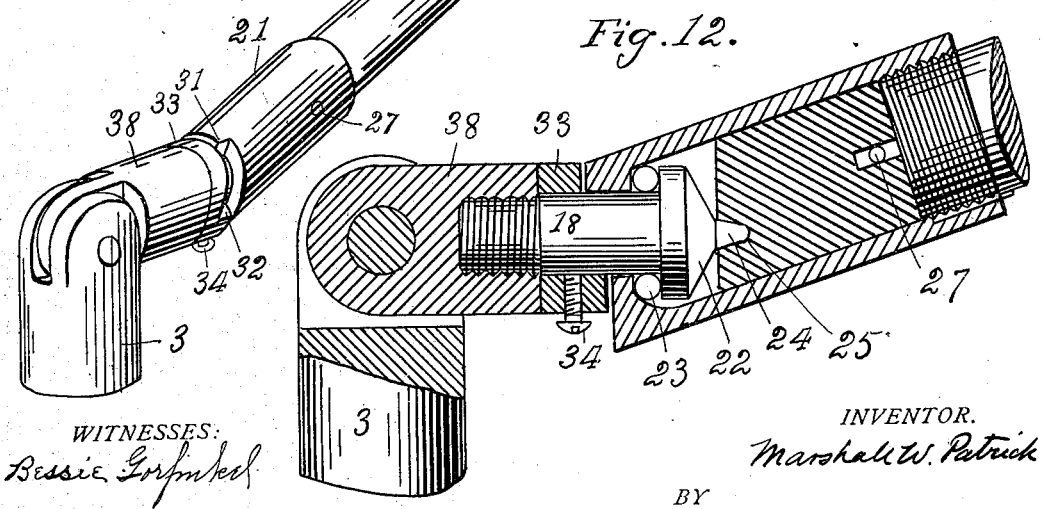

No. 734,742.

Patented July 28, 1903.

UNITED STATES PATENT OFFICE.

MARSHALL W. PATRICK, OF NILES, CALIFORNIA.

STEERING DEVICE.

SPECIFICATION forming part of Letters Patent No. 734,742, dated July 28, 1903.

Application filed September 11, 1902. Serial No. 123,025. (No model.)

*To all whom it may concern:*

Be it known that I, MARSHALL W. PATRICK, a citizen of the United States, residing at Niles, in the county of Alameda and State of California, have invented certain new and useful Improvements in Steering Devices, of which the following is a specification.

My invention relates to an improved steering device for velocipedes, motor-carriages, or the like, the object of my invention being to provide a steering device which shall be simple and convenient in operation and which will enable the rider to steer the vehicle in the desired direction without having to stretch or bend over to one side or the other in an inconvenient degree.

My invention is especially valuable to bicycle-riders, the steering device thereof being adapted as an auxiliary steering apparatus for use when the rider desires to sit upright and to exert little power in propelling the bicycle, as in coasting downhill or in riding slowly, thereby providing a restful change in position from that of leaning over the handles of the bicycle and grasping the same.

The invention may also in a simple form be adapted to automobiles, requiring less room for the driver to steer the vehicle.

My invention therefore resides in the novel construction, combination, and arrangement of parts for the above ends hereinafter fully specified, and particularly pointed out in the claims.

In the accompanying drawings, Figure 1 is a side elevation, partly in section, of my steering device applied to a bicycle. Fig. 2 is a side elevation of the device when in the position of disuse. Fig. 3 is a cross-section on the line A A of Fig. 2. Figs. 4, 5, 6, 7, 8 are perspective views of detached pieces of the apparatus. Fig. 9 is a plan view of the steering device. Fig. 10 is a similar view when the steering device is turned. Fig. 11 is a perspective view of a modified form of the device as adapted for an automobile. Fig. 12 is an enlarged sectional view of a portion thereof.

Referring to the drawings, 1 represents the frame of a bicycle, and 2 the ordinary steering-handles thereof. Around the steering-post 3 is loosely secured a collar 4, to which is pivotally attached, as shown at 5, a latching-bar 6. When this latching-bar is swung upward from the position shown in Fig. 2 to that shown in Fig. 1, it is adapted to engage a hook 7, pivoted at 8 upon a sleeve 9, secured upon the forwardly-extending support 10 for the handles 2, said hook being normally pressed upward by means of a spring 11. Said hook has its rear portion rounded, as shown at 12, so that when said locking-bar is swung upward the hook passes through an aperture 13 therein and engages the rear side of said bar, holding it in place. The under side of said hook is formed with a recess or cavity 15, which fits over the screw 16, as shown, so as to prevent strain upon the pivot 8 when the steering-post is turned by means of the auxiliary handle, as hereinafter described. Upon the upper end of said latching-bar, which is forked, is pivoted, as shown at 17, a stem 18, the front portion of which is flattened, as shown at 19, while the rear portion is rounded and passes through a rounded aperture 20 in the oblique end of a sleeve 21. Said stem has formed thereon a flanged head 22, which rests against ball-bearings 23, which in turn rest against the end of the sleeve 21 around the aperture 20. Said head is formed with a protuberance 24, which enters a socket 25 in the plug 26, said plug being inserted in said sleeve 21. A pin 27 passes through the sleeve and through a groove 28 in the end of the plug, preventing the latter from turning in the sleeve. In the outer end of the sleeve is screwed the handle-bar 29, carrying at its end the adjustable handle 30. The front end of said plug is cut off obliquely to the axis thereof, and in like manner the front end of the sleeve is formed obliquely to the axis of said sleeve. The stem 18 enters said sleeve at right angles to said oblique end, as shown. The result of this construction is that when the handle-bar is turned slightly on its axis there ensues a slight rotation of the stem about the latching-bar, and thereby also through the hook 7 a slight rotation is imparted to the steering-post. When said bar has been turned through a certain limiting angle, the maximum amount of deviation that can be obtained in this way has been reached and it is necessary to prevent any further turning of the handle. The front end of the sleeve is therefore formed with shoulders 31, which when the handle-bar has been turned on its axis to a sufficient extent engage with one or the other of the shoulders 32 upon a stop 33, mounted upon the stem 18 and secured thereon by a set-screw 34. When the shoulders have engaged each other, as above described, the front wheel may be further turned and the bicycle steered by a movement of the handle-bar to one side in the same way as if said handle-bar were rigidly attached to the steering-post. It is also possible to combine the two movements, the vibratory movement of the steering-bar about the axis of the steering-post and the twist of the steering-bar upon its own axis, in any proportion that may be necessary, the effect of twisting the steering-bar on its axis being to diminish the extent to which it needs to be vibrated about the steering-post.

When it is desired not to use the auxiliary steering-bar, it is swung downward upon the pivot 17, the stop 33 then engaging the rounded portion of the hook and forcing said hook downward, so as to release said latching-bar from the hook. Said latching-bar then swings backward to the position shown in Fig. 2. The handle is formed with a socket 36, which in the position shown in Fig. 2 rests upon a rubber block secured upon the frame of the machine by means of a collar 37. The lower end of the handle-bar 29 abuts against the plug 26 and holds it in position.

In the modification shown in Figs. 11 and 12 the latching-bar may be dispensed with, and the steering-bar may be attached directly to the steering-post of the automobile. In this case the stem 18 is screwed into a collar 38, which is attached to the steering-post 3 of the automobile.

I claim—

1. In a steering device, the combination with the steering-post, of a stem attached thereto, a laterally-movable rotatable steering-handle, and a pivotal connection between the end of said stem and the end of said steering-handle maintaining said stem and steering-handle oblique to each other, whereby when said steering-handle is turned on its axis the stem is rotated about the steering-post, substantially as described.

2. In a steering device, the combination with the steering-post, of a stem attached thereto, a steering-handle, a sleeve carried upon the lower end of said handle having its front end oblique to said handle, said stem having a head bearing against said oblique end, and means for maintaining said head thereagainst, substantially as described.

3. In a steering device, the combination with a steering-post, of a stem pivotally attached thereto, a steering-handle, a sleeve on the lower end of said handle, said sleeve having an oblique apertured end, said stem passing through said aperture and having a head thereon within the sleeve, and a plug in said sleeve abutting against said head, substantially as described.

4. In a steering device, a steering-post, a laterally-projecting stem connected therewith and provided with a shouldered abutment, and an axially-rotatable handle secured to the stem at an angle and provided with means for engaging with said shoulders and limiting the rotation of the handle on its axis, substantially as described.

5. In a steering device, a steering-post, a laterally-projecting stem connected therewith, a shouldered stop on the stem, and an axially-rotatable handle secured to the stem at an angle, the inner end of the handle being cut off at an inclination and provided with stops for engaging with the shoulders of the stop, substantially as described.

6. In a steering device, a stem, an axially-rotatable handle secured thereto at an angle, and means for detachably connecting said stem to the steering-post of a vehicle, substantially as described.

7. In a steering device, a stem, an axially-rotatable handle secured thereto at an angle, flexible means for detachably connecting the stem to the steering-post of a vehicle, and means for holding said device in or out of its operative position, substantially as described.

8. In a steering device, a latch-bar, a latch for engaging therewith, a stem flexibly connected with the bar, an axially-rotatable handle secured to the stem at an angle, and means for supporting the free end of the handle when the device is in an inoperative position, substantially as described.

9. In a steering device, a collar and a sleeve, each provided with means for securing it to the steering-post of a vehicle, a latch-bar pivotally secured to the collar and a latch secured to the sleeve in position for engaging with the bar and holding it when the device is in its operative position, a stem flexibly secured to the bar, an axially-rotatable handle secured to the stem at an angle, and a support for the free end of the handle when the device is in its operative position, substantially as described.

In witness whereof I have hereunto set my hand in the presence of two subscribing witnesses.

M. W. PATRICK.

Witnesses:
FRANCIS M. WRIGHT,
BESSIE GORFINKEL.